W. W. HARRISON.
MOTOR DRIVEN LAWN MOWER.
APPLICATION FILED SEPT. 4, 1909.
963,146.
Patented July 5, 1910.
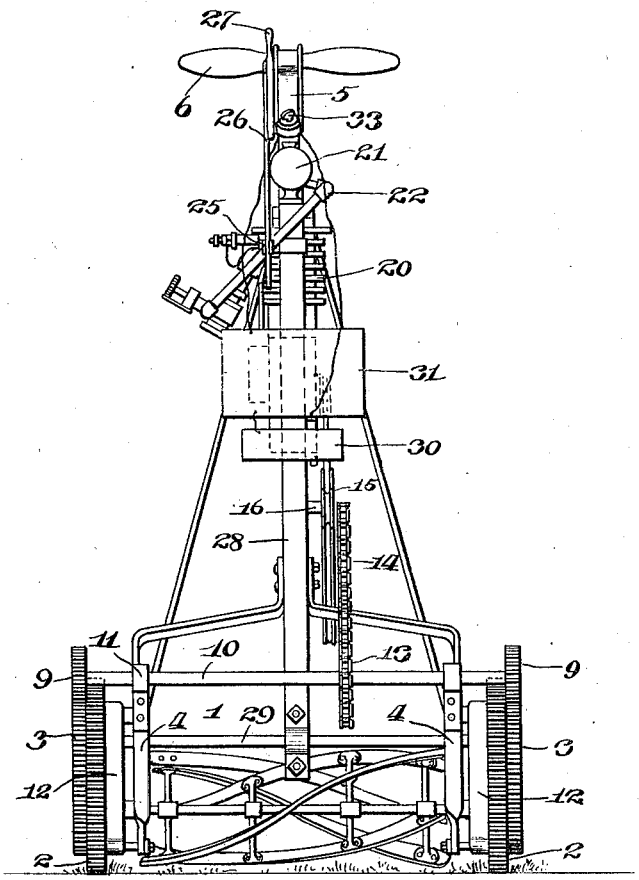

W. W. HARRISON.
MOTOR DRIVEN LAWN MOWER.
APPLICATION FILED SEPT. 4, 1909.
963,146.
Patented July 5, 1910.
2 SHEETS—SHEET 2.
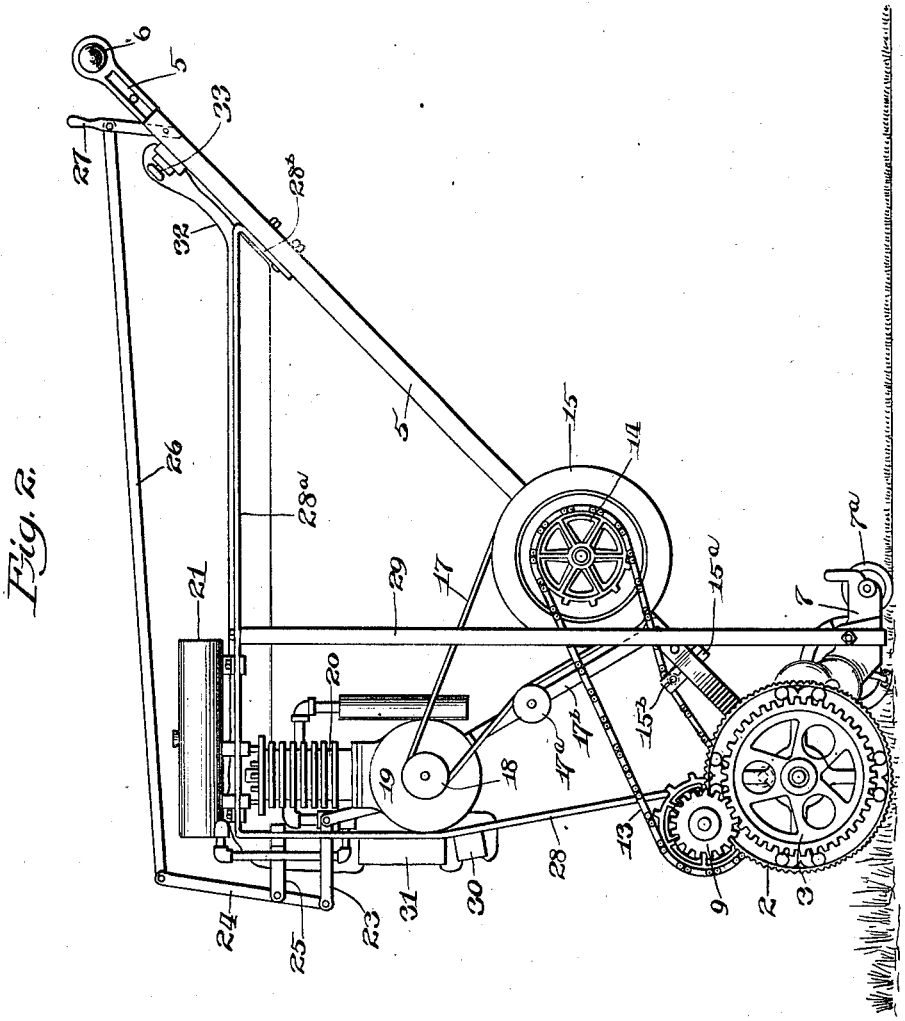

UNITED STATES PATENT OFFICE.

WILLIAM W. HARRISON, OF GLENSIDE, PENNSYLVANIA.

MOTOR-DRIVEN LAWN-MOWER.

963,146.  Specification of Letters Patent.  Patented July 5, 1910.

Application filed September 4, 1909. Serial No. 516,245.

*To all whom it may concern:*

Be it known that I, WILLIAM W. HARRISON, a citizen of the United States, residing at Glenside, Montgomery county, State of Pennsylvania, have invented certain new and useful Improvements in Motor-Driven Lawn-Mowers, of which the following is a full, clear, and exact description, reference being had to the accompanying drawings, forming a part of this specification.

My invention relates to lawn mowers combined with motor devices to drive or operate the same by power; and has for its objects to provide a simple and effective construction, in which the weight and energy developed by the motor will be balanced in respect to the center of gravity of the mower mechanism and the operating handle thereof; also in which the means for controlling the motor relatively to the driving mechanism between it and the mower will be under ready and perfect control of the operator without interfering with his manual hold of the grasping bar of the mower handle; also in which the connecting actuating devices between the mower shaft and the driving shaft of the motor are simple and adapted to effectively deliver the power developed and to control its speed of delivery.

To these ends my invention consists of the combination, with a lawn mower, of the usual hand-driven type, having a vertically-inclined operating handle with grasping bar, of a light weight motor, preferably a gasolene or explosive engine, with electric sparker device, and connecting actuating mechanism combining the motor engine with the mower shaft, and means, contiguous to the grasping bar of the mower handle, to control the motor device.

In the accompanying drawings illustrating my invention, Figure 1 is a front view of a motor driven lawn mower embodying my invention, and Fig. 2 is a side elevation thereof showing the combining and actuating mechanisms between the motor engine and mower, and adjunctive elements.

Referring now to said drawings, 1 indicates generally a lawn mower of one of the usual hand-driven types, comprising the usual ground-wheels 2, the frame 4, the operating handle 5 with its transverse grasping bar 6, and the rearwardly-disposed pair of roller bearing brackets 7 on either side of the frame 4, for the supplemental ground roller.

The changes which I have made in the mower element to embody and combine it with the other elements hereinafter described, are: The single supplemental ground roller usually used between the pair of rear bearing brackets 7, 7, is preferably dispensed with, and a pair of small wheels 7ª substituted therefor; but each of these brackets is utilized for the additional purpose of supporting one member of the combining frame between the motor and the mower. Mounted on the face of the flanged ground wheel 2, and on the same shaft, is a geared wheel 3, and meshing therewith is a smaller cog wheel 9, the shaft 10 of which has its bearings in a bracket 11 screwed indirectly to a fixed part 12 of the frame 4. This shaft 10 carries a sprocket wheel and chain 13 which latter passes over a sprocket wheel 14 on the face of a pulley 15, these latter having a bearing on a short shaft 16 mounted in the operating handle 5 of the mower. An idler 15ᵇ, carried on a bearing bolt 15ª mounted in the handle 5, is preferably supplied. The pulley 15 is connected by a belting 17 to small pulley 18 projecting through the crank casing 19 of a gasolene engine motor 20, and preferably passes over an idler 17ª carried on a cross-bar 17ᵇ the opposite ends of which are fast to the engine casing and the operating handle. The motor shown is of a usual and known type, it being observed that the engine is dependingly mounted and in a vertical plane substantially is a direct line over the mower, whereby its center of gravity is maintained and its weight applied in a manner interfering to the least extent with the traction of the mower and with the operator in guiding the machine by its operating handle. The sparking device 30 and battery 31 are of usual construction and are carried on frame bar 28, while the circuit wires 32 are governed by switch 33 mounted on operating handle 5 contiguous to the handle 27 and grasping bar 6.

The engine is supplied with gasolene from tank 21 through supply pipe 22, it being noted that such tank is supported horizontally and transversely to and over the motor. The in-take is effected by the usual means, which are governed in my device by means constituting an important feature of the invention and consisting of sliding bar 23, linked to lever 24 which rocks on fixed arm 25, the upper end of lever 24 being linked at its other end to actuating rod 26, linked to handle 27 pivotally fixed to the operating handle 5 of the mower, in such manner and location as to be contiguous to the grasping bar 6 of said handle; hence the operator can, without removing his grasp of the handle, actuate the in-take of the motor and hence control not only the speed of the motor but its actual operation, and bring the machine to a stop or start it at pleasure.

The connecting and combining means for the motor and mower elements consists, in addition to the pulley and sprocket mechanism, gears, gear shafts and their bearings already described, of a fr me composed essentially of a bar 28 braced at its base to a fixed cross-rod 29 forming part of the mower frame, and about centrally disposed on such cross-rod 29, so that when viewed from the front of the machine it will be in line of view of the operating handle 5 (see Fig. 2), and it rises vertically to a point slightly below the horizontal plane of the upper end of the operating handle. At its top the bar 28 proceeds in a horizontal direction forming the part 28$^a$ extending to the operating handle and braced thereto at 28$^b$. Slightly forward of its center, the portion 28$^b$ of the frame is reinforcingly supported by a pair of vertical standards 29$^a$ rising from each supplemental ground-roller bearing-bracket 7 of the mower frame.

The principle of construction of the device and its mode of operation will be readily understood from the description given, and it is manifest that the combined mechanism results in a powerfully braced machine, with the weight of its engine and adjunctive parts in substantial perpendicularity with the mower proper, and with its power devices under perfect control of the operator with his guiding manipulation of the mower.

Having thus described my invention, I claim as new and desire to secure by Letters Patent:—

1. A power-driven mower, comprising the combination with a mower of the type recited, including its main frame, operating handle, ground wheels, their shaft, and cog-gearing thereon, of a connecting cog-gearing, its shaft and bearing bracket therefor mounted on the main frame, a motor dependingly supported over and in the same vertical plane with the mower, connecting actuating means between the motor and said last-mentioned gearing; a supporting frame for the motor and its adjunctive parts consisting of a vertically disposed standard mounted on the frame of the mower, a horizontally-disposed bar, braced at one end to said standard and at its other end to the operating handle of the mower, and means to reinforcingly support said horizontal bar from the frame of the mower.

2. A motor-driven lawn-mower comprising in combination with a motor and a supporting frame therefor mounted between the main frame and operating handle of the mower; a mower of the type recited, including its main frame operating handle, ground wheels, their shaft and cog-gearing fast thereon, gears meshing therewith, a shaft for said gears, and bearings for said shaft, mounted on the mower frame, a sprocket wheel on said last mentioned shaft, its sprocket chain, a short shaft mounted on the operating handle of the mower, a sprocket wheel on said shaft, and with which said sprocket chain engages, a pulley on said short shaft, and connecting belting between said pulley and the motor.

3. In combination, a mower of the type recited, including its main frame operating handle, ground wheels and their shaft, cog gearing 3 on the flanged faces of the ground wheels and on the opposite ends of their shaft, a supplemental frame comprising a bracket 11, a shaft 10 having its bearings in said bracket, gears 9 on the ends of said shaft, meshing with said cog-gearing 3 on the ground wheels shaft, a motor-supporting frame comprising a horizontal bar 28$^a$ mounted fixedly between the main frame of the mower and the inclined operating handle thereof, a motor dependingly mounted on said motor-supporting frame, and connecting actuating mechanism between the motor and said cog gearing 9 operating to actuate the geared ground wheels shaft.

4. The combination with a mower of the type recited, including its main frame, ground-wheels shaft and inclined operating handle, of a motor of the type recited, a motor-supporting frame mounted between the main frame of the mower and said operating handle, said frame including a horizontally-disposed bar adapted to dependingly support the motor and its adjunctive parts, connecting actuating mechanism between the motor and the ground wheels shaft of the mower, and means to control the in-take of the engine, consisting of a rod suitably connected thereto at one end and an actuating handle connected to its opposite end, said handle being pivotally mounted on the operating handle of the mower contiguous to its grasping bar.

5. In combination, a mower of the type recited, including its frame, operating handle, ground wheels, their shaft and gearing fast thereon, gears meshing therewith, a shaft carrying said gears on its opposite ends, bearings for said shaft mounted on the main frame, a sprocket wheel on said shaft, a sprocket wheel and a pulley wheel, a stub shaft for both of the latter, mounted on the mower operating handle, a chain between said sprockets, a motor-supporting frame including a horizontal member, a motor dependingly mounted thereon and having a pulley shaft extending through its engine casing, a pulley thereon, belting between said pulleys, and manually-operated means contiguous to the grasping bar of the mower-operating handle adapted to control the actuation of the motor.

6. A motor-driven lawn mower, comprising in combination a mower of the type recited, including its frame, operating handle, ground wheels and their shaft, a motor, a supplemental frame adapted to support the motor dependingly over the mower, connecting means to transmit developed power to the ground wheels shaft of the mower, and means to control the actuation of the motor, comprising a sliding bar 23, rocking lever 24 to which it is linked, a fixed arm 25 on which said lever is mounted, an actuating rod 26 linked to the other end of said rocking lever, and a handle 27 pivotally connected to said rod and to the operating handle 5 of the mower and contiguous to the grasping bar 6 thereof.

In testimony whereof, I have hereunto affixed my signature this second day of September A. D. 1909.

WILLIAM W. HARRISON.

Witnesses:
EMERSON CONRAD,
ANNA LACEY.